US010675601B2

(12) United States Patent
Fisher

(10) Patent No.: US 10,675,601 B2
(45) Date of Patent: Jun. 9, 2020

(54) CROSS-FLOW BLENDER SYSTEM AND METHODS OF USE FOR WELL TREATMENT OPERATIONS

(71) Applicant: Halliburton Energy Services, Inc., Houston, TX (US)

(72) Inventor: Chad Adam Fisher, Cache, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 127 days.

(21) Appl. No.: 16/066,234

(22) PCT Filed: Mar. 23, 2016

(86) PCT No.: PCT/US2016/023789
§ 371 (c)(1),
(2) Date: Jun. 26, 2018

(87) PCT Pub. No.: WO2017/164866
PCT Pub. Date: Sep. 28, 2017

(65) Prior Publication Data
US 2020/0038826 A1 Feb. 6, 2020

(51) Int. Cl.
*B01F 15/02* (2006.01)
*B01F 13/00* (2006.01)
*E21B 43/267* (2006.01)
*E21B 21/06* (2006.01)

(52) U.S. Cl.
CPC ...... *B01F 15/0292* (2013.01); *B01F 13/0016* (2013.01); *B01F 15/0243* (2013.01); *B01F 2215/0081* (2013.01); *E21B 43/267* (2013.01)

(58) Field of Classification Search
CPC ...... E21B 43/26; E21B 43/267; E21B 21/062; E21B 33/13; E21B 47/06; E21B 43/40
See application file for complete search history.

(56) References Cited

U.S. PATENT DOCUMENTS

| 4,886,367 A | 12/1989 | Bragg et al. |
| 6,193,402 B1 | 2/2001 | Grimland et al. |
| 8,056,635 B2 | 11/2011 | Shampine et al. |

(Continued)

FOREIGN PATENT DOCUMENTS

WO 03/072328 A1 9/2003

OTHER PUBLICATIONS

International Preliminary Report on Patentability issued in related PCT Application No. PCT/US2016/023789 dated Oct. 4, 2018, 11 pages.

(Continued)

*Primary Examiner* — Zakiya W Bates
(74) *Attorney, Agent, or Firm* — John Wustenberg; Baker Botts L.L.P.

(57) ABSTRACT

Certain methods and systems for blending treatment fluids include at least one of proppant or diverters for use in well treatment operations. In one embodiment, the methods comprise receiving a base fluid; mixing an additive to a portion of the base fluid to form at least a portion of the well treatment fluid; and supplying the portion of the well treatment fluid to at least one or both of a first discharge pump selectively fluidically coupled to a mixer and a second discharge pump selectively fluidically coupled to the mixer. A plurality of valves are operated so as to select one of the first discharge pump and the second discharge pump to receive a flow of the portion of the well treatment fluid from the mixer.

16 Claims, 7 Drawing Sheets

(56) References Cited

U.S. PATENT DOCUMENTS

| | | |
|---|---|---|
| 8,211,296 B2 | 7/2012 | Angelilli et al. |
| 8,322,424 B2 | 12/2012 | Leugemors et al. |
| 2009/0154288 A1 | 6/2009 | Heathman |
| 2014/0262338 A1 | 9/2014 | Shen et al. |

OTHER PUBLICATIONS

International Search Report and Written Opinion issued in related PCT Application No. PCT/US2016/023789 dated Nov. 28, 2016, 14 pages.

CROSS-FLOW BLENDER SYSTEM AND METHODS OF USE FOR WELL TREATMENT OPERATIONS

CROSS-REFERENCE TO RELATED APPLICATION

The present application is a U.S. National Stage Application of International Application No. PCT/US2016/023789 filed Mar. 23, 2016, which is incorporated herein by reference in its entirety for all purposes.

TECHNICAL FIELD

The present disclosure relates generally to techniques for fracturing subterranean formations, and more particularly, to the use of a cross-flow blending system for slurry handling during fracturing operations.

BACKGROUND

Subterranean treatment fluids are commonly used in stimulation, sand control, and completion operations. As used herein, the term "treatment," or "treating," refers to any subterranean operation that uses a fluid in conjunction with a desired function and/or for a desired purpose. The term "treatment," or "treating," does not imply any particular action by the fluid.

An example of a subterranean treatment that often uses an aqueous treatment fluid is hydraulic fracturing. In an example hydraulic fracturing treatment, a viscous fracturing fluid is introduced into the formation at a high enough rate to exert sufficient pressure on the formation to create and/or extend fractures therein. The viscous fracturing fluid may suspend proppant particles that are to be placed in the fractures to prevent the fractures from fully closing when hydraulic pressure is released, thereby forming conductive channels within the formation through which hydrocarbons can flow toward the well bore for production. In certain circumstances, variations in the subterranean formation will cause the fracturing fluid to create and/or extend fractures non-uniformly. Typically, one or more dominant fractures may extend more rapidly than non-dominant fractures. These dominant fractures utilize significantly more fracturing fluid than non-dominant fractures, thereby reducing pressure on non-dominant fractures and slowing or stopping their extension. Operators have addressed the unbalanced distribution of fracture fluid by introducing a certain quantity of diverters into the fracturing fluid when dominant fractures are identified. The diverters may travel to the dominant fractures and restrict the flow of fracturing fluid to the dominant fractures or plug the dominant fractures. These diverter operations may typically be alternated with proppant fracturing operations to achieve maximum subterranean stimulation.

Multiple high-pressure pumps may introduce these subterranean treatment fluids into the wellbore at pressures sufficient to achieve the desired operations. As many as twenty or more of these pumps may be linked to one another through a common manifold to combine the output of the pumps. However, the abrasive nature of treatment fluids, particularly when combined with solid particulate, tends to wear out the internal components of these high-pressure pumps as well as any associated valves and piping systems. Use of larger particulate, such as diverters, can worsen these harmful effects. Moreover, diverters are specifically chosen and designed to create plugs and bridges inside a subterranean formation. The same desirable plugging characteristics of the compositions and materials used as diverters make them particularly likely to plug and block off small flow paths in high-pressure pumps and associated equipment.

At a particular job location, operators may use blenders to add the particulate components to treatment fluids to form a slurry. To minimize high-pressure pump exposure to diverter, traditional hydraulic fracturing operations use separate blenders and high-pressure pumps for the diverter and proppant streams. Each stream may then feed to a common manifold before pumping into the well. This approach requires extra sets of expensive equipment and increases the space and time required for equipment staging at a particular well site.

Figure 1:
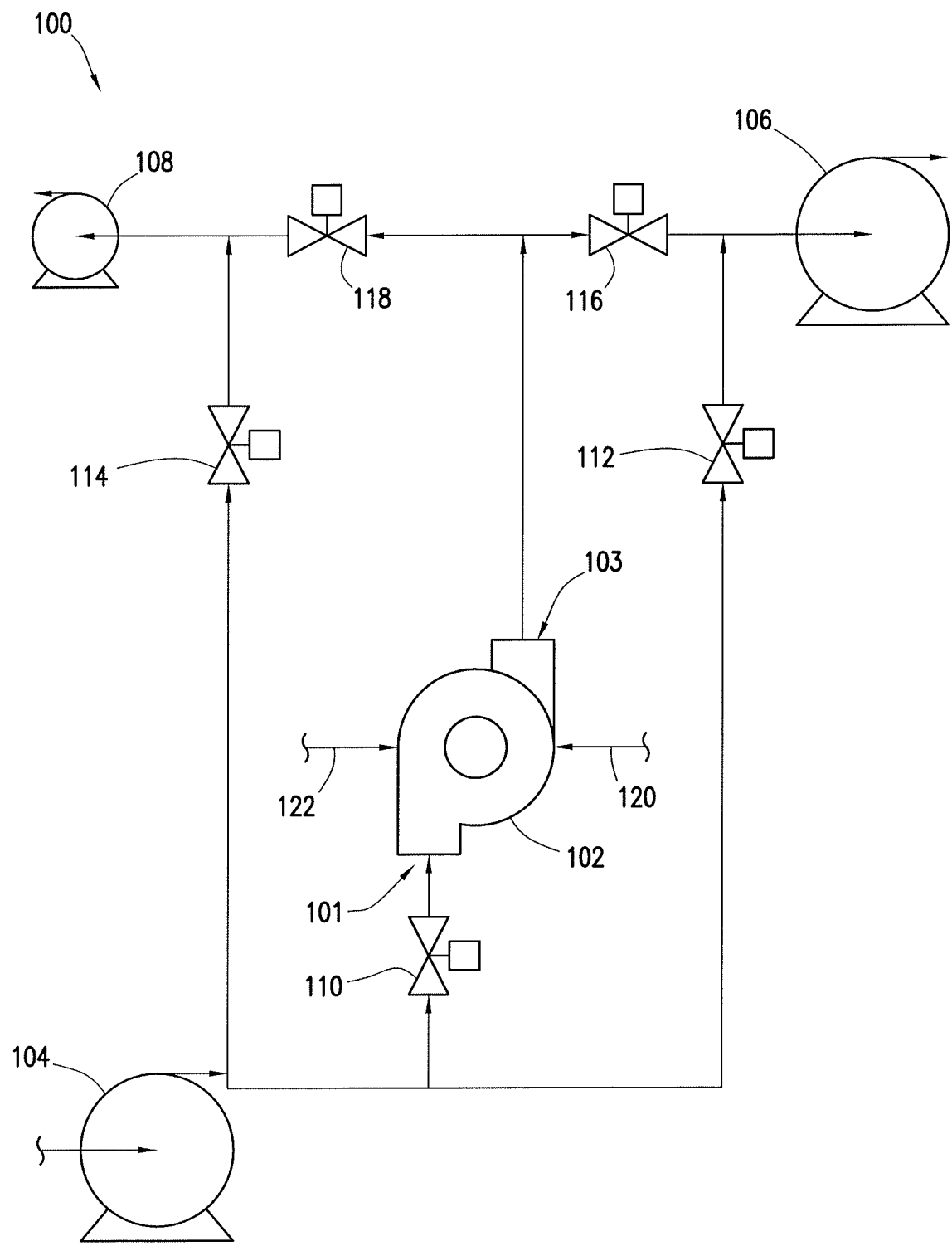
FIG. 1 is a schematic diagram of an embodiment of a cross-flow blender system, in accordance with an embodiment of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to techniques for fracturing subterranean formations, and more particularly, to the use of a cross-flow blending system for slurry handling during fracturing operations. The present disclosure provides improved systems and methods for mixing and introducing well treatment fluids comprising proppant and diverters at a well site for introduction into a wellbore.

Illustrative embodiments of the present disclosure are described in detail herein. In the interest of clarity, not all features of an actual implementation may be described in this specification. It will of course be appreciated that in the development of any such actual embodiment, numerous implementation specific decisions may be made to achieve the specific implementation goals, which may vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Typical well stimulation jobs may include a multitude of different operations using different well treatment fluids. Hydraulic fracturing operations use well treatment fluids called fracturing fluids. Fracturing fluids are introduced into a wellbore at pressures sufficient to create or enhance one or more fractures within a subterranean formation. In many fracturing operations, fracturing fluids contain suspended solid particulate called proppant. During fracturing operations, proppant is placed in the created or enhanced fractures and used to hold or prop open the fractures once the pressure is reduced and the well is placed into production. Hydraulic fracturing operations are often alternated with diverter operations to isolate particular fractures and maximize well stimulation. Diverter operations use well treatment fluids that are created using solid particulate called diverter.

Both proppant and diverter can be harsh on the high-pressure pump and their associated piping and valves used to introduce well treatment fluids into a wellbore. Generally, the composition and larger particle size and of the diverter makes it particularly harsh on this equipment. The diverters can easily plug off small orifices in the piping and valve systems used for well treatment operations. Moreover, friction experienced during the well treatment process can melt certain diverter materials by heating them to temperatures in excess of their degradation temperature. Thus, it is advantageous to limit the number of high-pressure pumps exposed to the diverter. In stimulation jobs that do not require diverter operations, it is also often advantageous to create a concentrated proppant stream that is then sent to an isolated set of high-pressure pumps, thereby minimizing the number of high-pressure pumps that are exposed to the wear and tear associated with pumping proppant rich treatment fluids. Moreover, concentrated proppant streams are less abrasive than streams containing lower concentrations. Conventional well treatment jobs accomplish these goals by using separate blending and pumping systems to create and pressurize the different well treatment fluids. This approach requires extra sets of expensive equipment and increases the space and time required for equipment staging at a particular well site.

The present disclosure provides systems and methods for using the same blender to create both fracturing fluids and well treatment fluids suitable for diverter operations, while still minimizing the number of high-pressure pumps that are exposed to the diverter material. The systems and methods of the present disclosure may also be used in well stimulation jobs that do not require diverter operations to provide a concentrated proppant stream. This concentrated stream mixes with the "clean" fluid stream after the high-pressure pumps to form the well treatment fluid before being introduced to the wellbore. This also minimizes the number of high-pressure pumps that are potentially exposed to proppant. As would be understood by one of ordinary skill in the art having the benefit of the present disclosure, the systems and methods disclosed herein are not limited to use for mixing proppant and diverters. In certain embodiments, the systems and methods of the present disclosure may be used to mix any additive or component to a base fluid to form all or part of a treatment fluid for use in well treatment operations.

In certain embodiments, the methods and systems of the present disclosure are useful for blending a well treatment fluid at a well site. The treatment fluids used in the methods and systems of the present disclosure may comprise any base fluid known in the art, including aqueous base fluids, non-aqueous base fluids, and any combinations thereof. The base fluid may be any base fluid known in the art to be suitable for wellbore treatment operations, including, but not limited to, water, acid, and gels. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may comprise water from any source. The treatment fluids used in the present disclosure may comprise an additive such as a proppant or a diverter. In certain embodiments, the treatment fluids used in the methods and systems of the present disclosure optionally may comprise any number of additional additives. Examples of such additional additives include, but are not limited to, salts, surfactants, acids, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like.

The methods may comprise: receiving a base fluid; mixing an additive to ta portion of the base fluid to form at least a portion of the well treatment fluids; and supplying the portion well treatment fluid to In certain embodiments, the systems of the present disclosure comprise a mixer. In some embodiments, the mixer may be any type of mixer appropriate for receiving a base fluid and combining additives with said base fluid to form at least a portion of a well treatment fluid. Suitable mixers may include, but are not limited to a vortex mixer, centrifugal mixer, or blending tub. Moreover, it will be understood by one of ordinary skill in the art that the mixer may be used to mix one or more additives of differing sizes and compositions (i.e., proppant and diverters) with the base fluid to create different well treatment fluids. A base fluid source may be selectively fluidically coupled to the inlet of the mixer. In some embodiments, the base fluid source may be a supply pump fluidically coupled to one or more tanks or tankers. One or more discharge pumps may be selectively fluidically coupled to the outlet of the mixer. In some embodiments, the systems further comprise a plurality of valves. The plurality of valves may be operable to fluidically couple the mixer to the base fluid source, the first discharge pump, or the second discharge pump.

In certain embodiments, the methods of the present disclosure are useful for blending well treatment fluids at a well site. The methods of the present disclosure may comprise: receiving a base fluid from a base fluid source; mixing an additive to a portion of the base fluid to form at least a portion of the well treatment fluids; and supplying the portion of the well treatment fluid to one or more discharge pumps. The methods of the present disclosure may further comprise operating a plurality of valves to select which of the discharge pumps is supplied with the portion of the well treatment fluid formed using the mixer. The methods of the present disclosure may further comprise operating the plurality of valves to change which discharge pump is selected to receive the well treatment fluid formed using the mixer without the discharge pumps losing fluid supply. The methods of the present disclosure may further comprise combining the portion of the well treatment fluid formed using the mixer with one or more "clean" fluid streams to create the well treatment fluid. The methods of the present disclosure may further comprise introducing the well treatment fluid into a wellbore penetrating at least a portion of a subterranean formation at a pressure sufficient to create or enhance one or more fractures.

Referring now to FIG. 1, an embodiment of a system for mixing and preparing well treatment fluids comprising proppant and diverters is depicted generally with reference numeral 100. The system 100 comprises a mixer 102 that may be used to mix a base fluid with either proppant or diverter material. The mixer 102 comprises an inlet 101 that is fluidically coupled to a supply pump 104. The supply pump 104 is a base fluid source that supplies a base fluid to the system. Supply pump 104 is depicted as a centrifugal pump, which may be a radial flow or axial flow centrifugal pump. In certain embodiments, the supply pump 104 may be any type of pump suitable to supply a base fluid to the mixer 102. In certain embodiments, the base fluid may be supplied directly to the mixer 102 from a base fluid source without the use of a pump.

The system 100 further comprises a first discharge pump 106 selectively fluidically coupled to an outlet 103 of the mixer 102. The first discharge pump 106 is used to pump a first portion the well treatment fluid to a first set of high-pressure pumps (not shown). The system 100 further comprises a second discharge pump 108 selectively fluidically coupled to the outlet 103 of the mixer 102. The second discharge pump 108 is used to pump a second portion of the well treatment fluid to a second set of high-pressure pumps (not shown). Between the supply pump 104 and the mixer 102 is an inlet valve 110 that is operable to fluidically couple the supply pump 104 and the mixer 102. Between the supply pump 104 and the first discharge pump 106 is a first bypass valve 112 that is operable to fluidically couple the supply pump 104 and the first discharge pump 106, thereby bypassing the mixer 102. Between the supply pump 104 and the second discharge pump 108 is a second bypass valve 114 that is operable to fluidically couple the supply pump 104 and the second discharge pump 108, thereby bypassing the mixer 102. Between the mixer 102 and the first discharge pump 106 is a first outlet valve 116 that is operable to fluidically couple the mixer 102 to the first discharge pump 106. Between the mixer 102 and the second discharge pump 108 is a second outlet valve 118 that is operable to fluidically couple the mixer 102 to the second discharge pump 108. The valves described herein may be any type of valve suitable for well treatment operations including, but not limited to ball valves, gate valves, plug valves, butterfly valves, pinch valves, and globe valves.

In some embodiments a proppant source 120 provides proppant to the mixer 102. Then the mixer 102 mixes the proppant with a base fluid to form a fracturing fluid. In other embodiments a diverter source 122 provides diverter material to the mixer 102. Then the mixer 102 mixes the diverter with a base fluid to form a well treatment fluid suitable for use in diverter operations.

Figure 2:
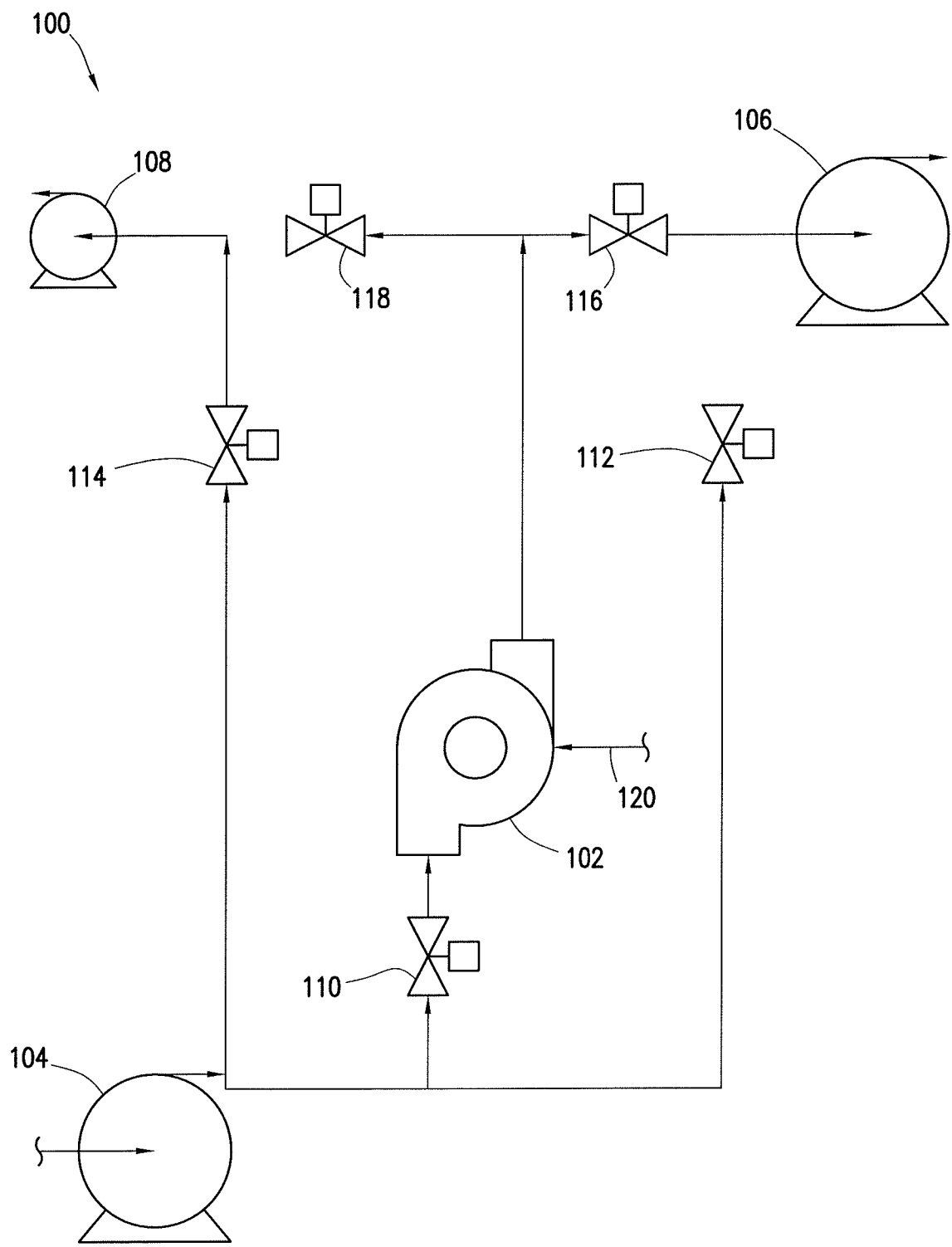
FIG. 2 is a schematic diagram of an embodiment of a cross-flow blender system, in use for proppant addition in accordance with an embodiment of the present disclosure.

FIG. 2 depicts an example configuration of the system 100 for hydraulic fracturing operations using proppant. In certain embodiments, the supply pump 104 supplies a base fluid suitable for hydraulic fracturing operations. As previously discussed, in hydraulic fracturing operations, it is often desirable to add proppant particles to the base fluid to create a fracturing fluid. For proppant blending, the system 100a is shown with the mixer inlet valve 110 in the open position and the first bypass valve 112 in the closed position, thereby fluidically coupling the mixer 102 to the supply pump 104. This directs the base fluid through the mixer 102, where it may be mixed with proppant from the proppant source 120. The first outlet valve 116 is shown in the open position and the second outlet valve 118 is shown in the closed position, thereby fluidically coupling the mixer 102 to the first discharge pump 106. This directs the flow of the proppant rich fluid to the first discharge pump 106. The first discharge pump 106 may pump the proppant rich fluid to a first set of high-pressure pumps (not shown) configured to handle the proppant rich fluid. The second bypass valve 114 is shown in the open position, thereby fluidically coupling the supply pump 104 and the second discharge pump 108. This directs an amount of the base fluid to the second discharge pump 108. The second discharge pump 108 may pump the clean base fluid to a second set of high-pressure pumps (not shown).

Figure 3:
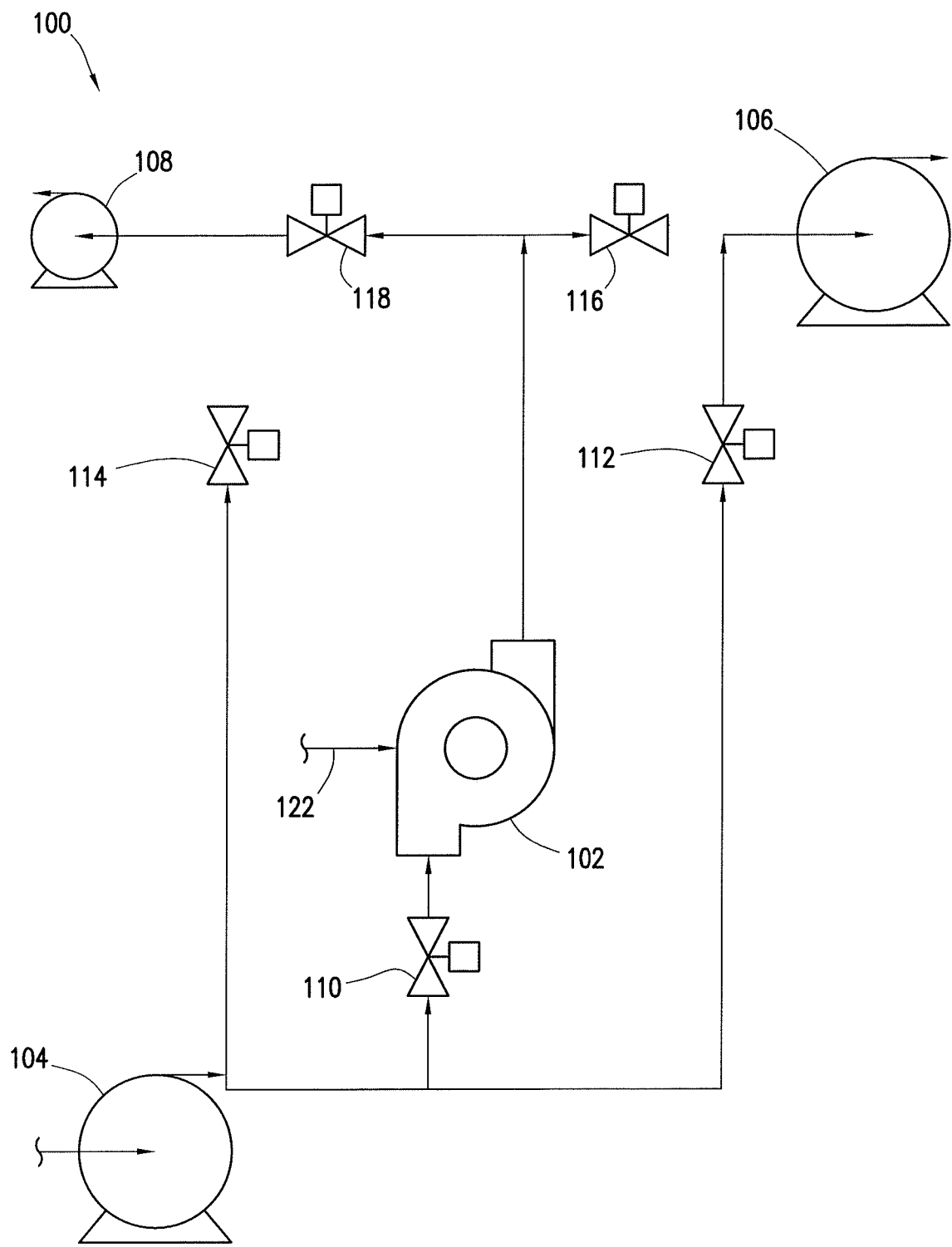
FIG. 3 is a schematic diagram of an embodiment of a cross-flow blender system, in use for diverter addition in accordance with an embodiment of the present disclosure.

FIG. 3 depicts an example configuration of the system 100 for diverter operations. As previously discussed, in diverter operations, diverter material may be added to a base fluid to create a well treatment fluid suitable for diverter operations. For diverter blending, the system 100 is shown with the mixer inlet valve in the open position and the second bypass valve 114 in the closed position, thereby fluidically coupling the mixer 102 and the supply pump 104. This directs the base fluid through the mixer 102, where it may be mixed with diverter from the diverter source 122. The second outlet valve 118 is shown in the open position and the first outlet valve is shown in the closed position, thereby fluidically coupling the mixer 102 and the second discharge pump 108. This directs the flow of the diverter rich fluid to the second discharge pump 108. The second discharge pump 108 may pump the diverter rich fluid to the second set of high-pressure pumps (not shown) configured to handle the diverter material. The first bypass valve 112 is shown in the open position, thereby fluidically coupling the supply pump 104 and the first discharge pump 106. This directs an amount of the base fluid to the first discharge pump 106. The first discharge pump 106 may pump the clean base fluid to the first set of high-pressure pumps (not shown).

Figure 4:
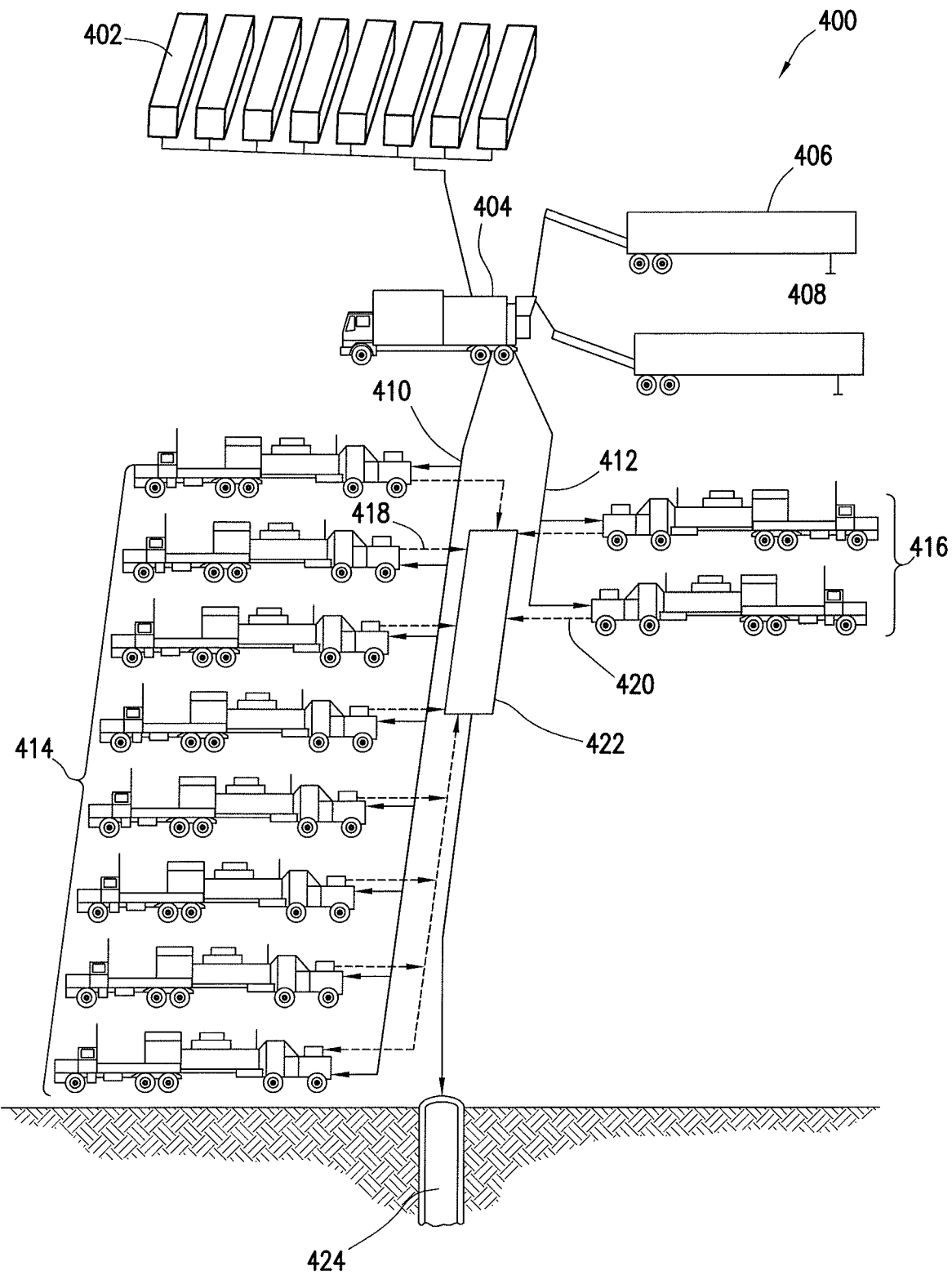
FIG. 4 is a perspective view of an embodiment of a cross-flow blender system installed at a well site for well treatment operations in accordance with an embodiment of the present disclosure.

Referring now to FIG. 4, a high-pressure pumping system 400 is shown in position at a well site for use in well treatment operations. In certain embodiments, system 400 includes a plurality of tanks 402 that supplies a base fluid to a cross-flow blending apparatus 404 in accordance with the systems and methods of the present disclosure. In certain embodiments, a first trailer 406 may supply a proppant to the cross-flow blending apparatus 404 and a second trailer 408 may supply a diverter to the cross-flow blending apparatus 404. The cross-flow blending apparatus 404 is shown with a first outlet stream 410 and a second outlet stream 412. The first outlet stream 410 feeds to a first set of high-pressure pumps 414. The second outlet stream 412 feeds to a second set of high-pressure pumps 416. In certain embodiments, the first set of high-pressure pumps 414 are configured to handle proppant rich fluid streams and the second set of high-pressure pumps 416 are configured to handle well treatment fluids suitable for diverter operations. In certain embodiments, a first set of discharge streams 418 from the first set of high-pressure pumps 414 and a second set of discharge streams 420 from the second set of high pressure pumps 416 are combined using a common manifold 422 prior to being introduced into a wellbore opening 424.

Figure 5:
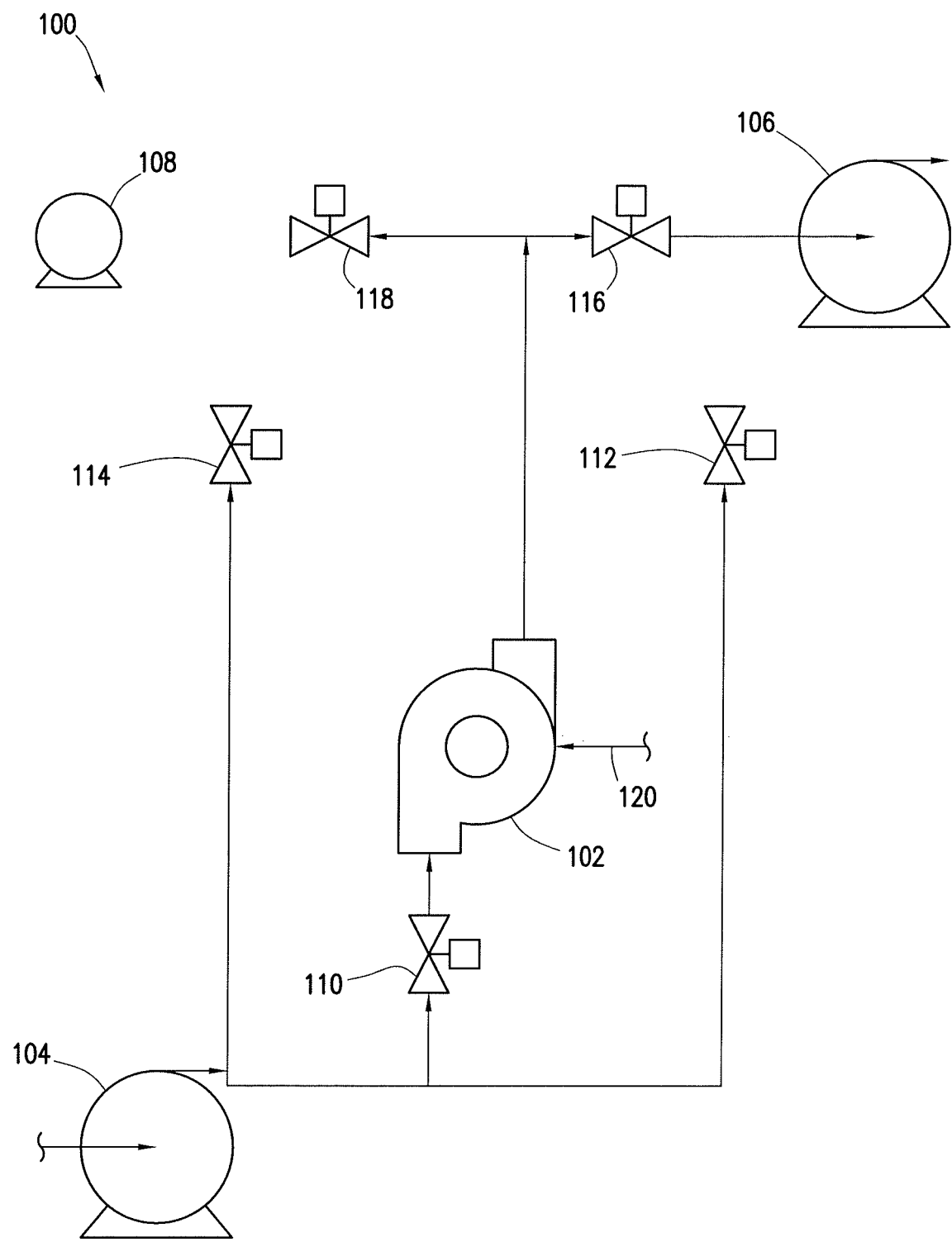
FIG. 5 is a schematic diagram of an embodiment of a cross-flow blender system, in use for proppant addition with a single operational discharge pump in accordance with an embodiment of the present disclosure.

In certain embodiments, the systems and methods of the present disclosure are suitable for use with only one discharge pump in operation. As would be appreciated by one of ordinary skill in the art, with the benefit of this disclosure, when only one discharge pump is in service, the valves feeding the other discharge pump are in the closed position. FIG. 5 depicts an example configuration of the system 100 with only one discharge pump in operation for hydraulic fracturing operations using proppant. The system 100 is shown with the mixer inlet valve 110 in the open position and the first bypass valve 112 in the closed position, thereby fluidically coupling the mixer 102 and the supply pump 104. This directs the base fluid through the mixer 102, where it may be mixed with proppant from the proppant source 120. The first outlet valve 116 is shown in the open position and the second outlet valve is shown in the closed position, thereby fluidically coupling the mixer 102 and the first discharge pump 106. This directs the flow of the proppant rich fluid to the first discharge pump 106. The second bypass valve 114 is shown in the closed position, thereby fluidically isolating the second discharge pump 108 that is not in use. Thus the systems and methods of the present disclosure are suitable for use as standalone mixers for individual fracturing operations using proppant.

Figure 6:
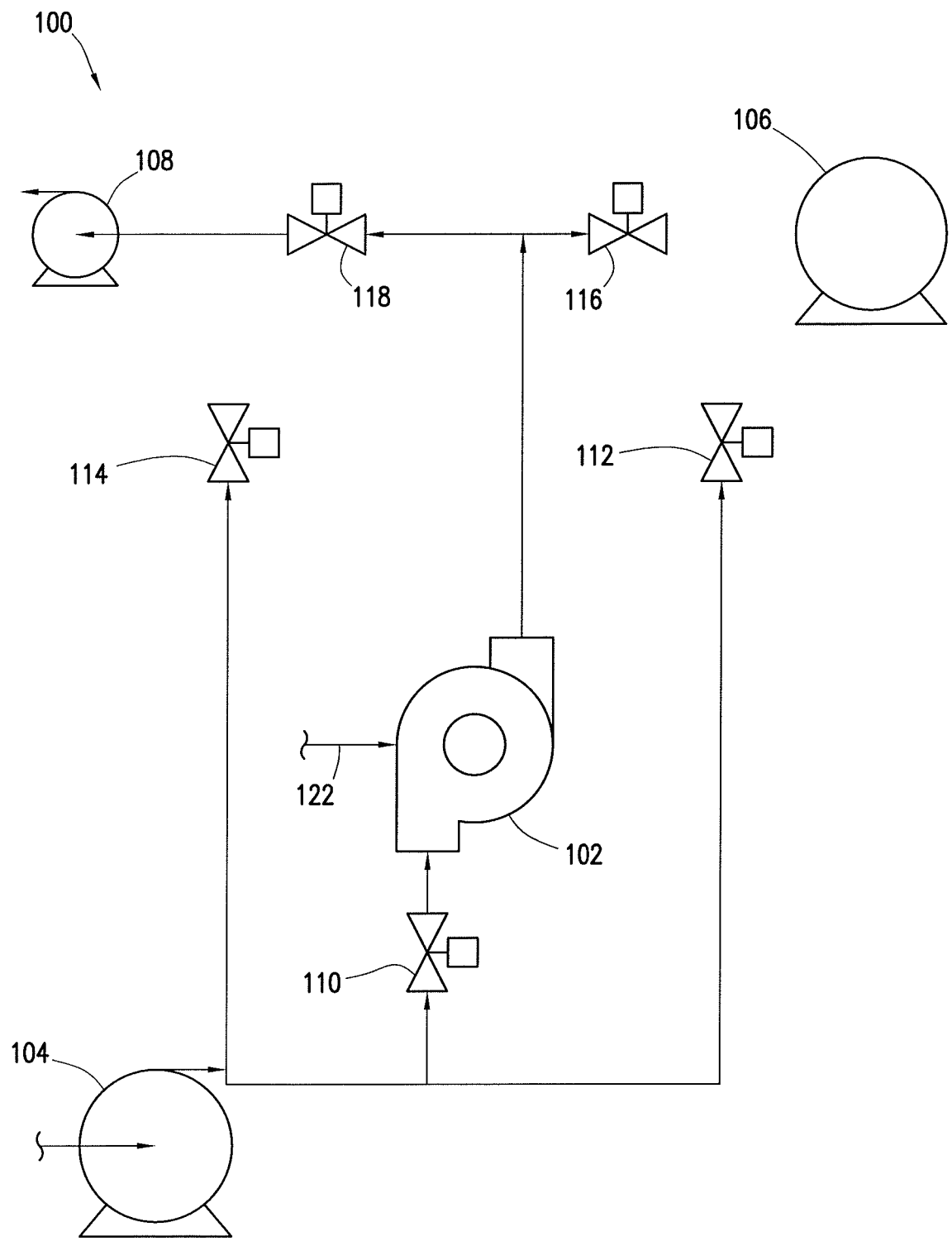
FIG. 6 is a schematic diagram of an embodiment of a cross-flow blender system, in use for diverter addition with a single operational discharge pump in accordance with an embodiment of the present disclosure.

FIG. 6 depicts an example configuration of the system 100 with only one discharge pump in operation for diverter operations. The system 100 is shown with the mixer inlet valve 110 in the open position and the second bypass valve 114 in the closed position, thereby fluidically coupling the mixer 102 and the supply pump 104. This directs the base fluid through the mixer 102, where it may be mixed with diverter material from the diverter source 122. The second outlet valve 118 is shown in the open position and the first outlet valve 116 is shown in the closed position, thereby fluidically coupling the mixer 102 and the second discharge pump 108. This directs the flow of the well treatment fluid to the second discharge pump 108. The first bypass valve 112 is shown in the closed position, thereby fluidically isolating the first discharge pump 106 that is not in use. Thus, the systems and methods of the present disclosure are suitable for use as standalone mixers for individual diverter operations.

Figure 7:
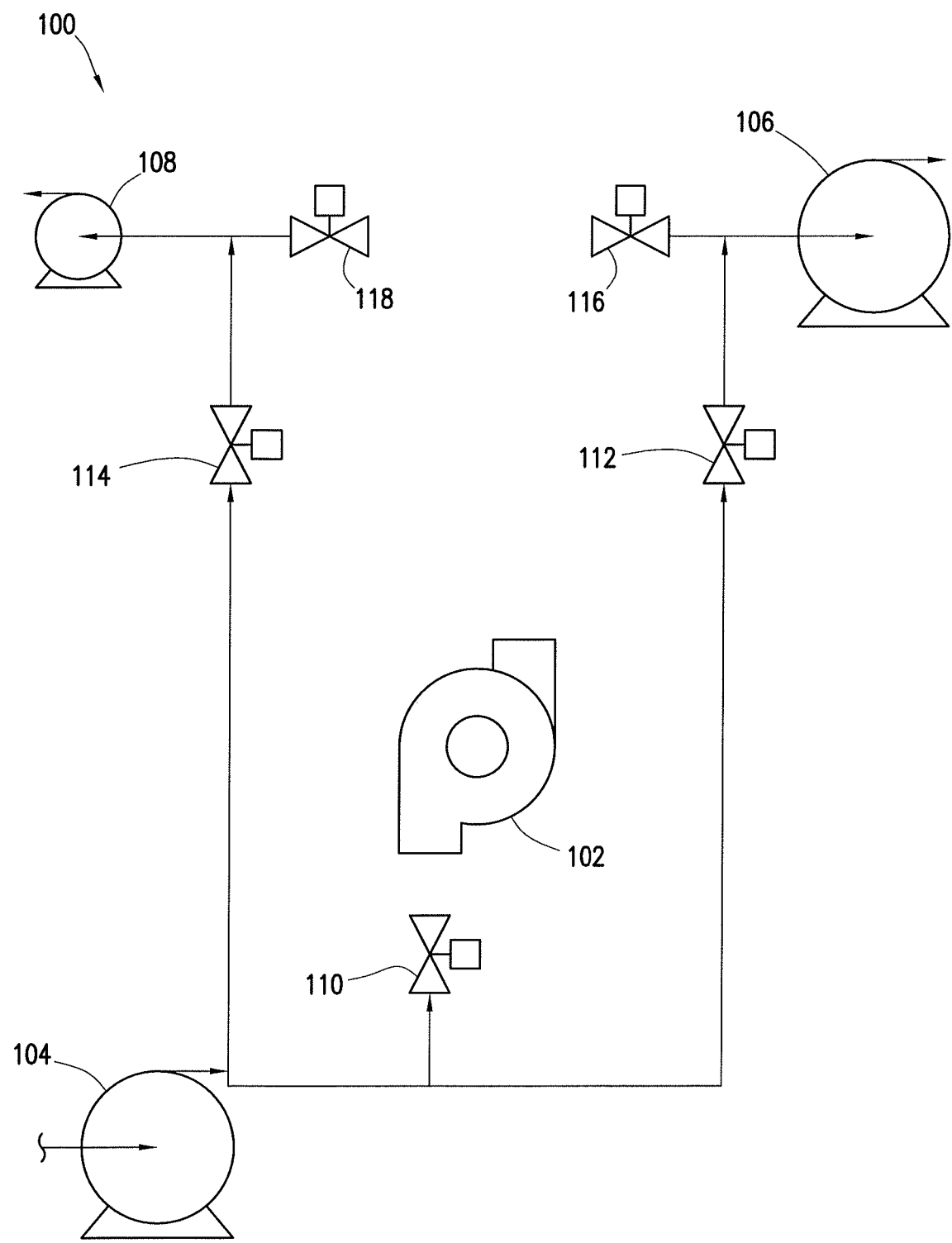
FIG. 7 is a schematic diagram of an embodiment of a cross-flow blender system, in use with the blender isolated in accordance with an embodiment of the present disclosure.

In certain embodiments, the systems and methods of the present disclosure are suitable for use without the use of the mixer. FIG. 7 depicts an example configuration of the system 100 without the use of the mixer 102. The mixer inlet valve 110, first outlet valve 116, and second outlet valve 118 are shown in the closed position, thereby fluidically isolating the mixer 102. The first bypass valve 112 is shown in the open position, fluidically coupling the supply pump 104 and the first discharge pump 106. The second bypass valve 114 is shown in the open position, fluidically coupling the supply pump and the second discharge pump 108.

As would be appreciated by one of ordinary skill in the art, it is undesirable to shut off fluid supply to the high-pressure pumps that are used for both hydraulic fracturing and diverter operations. Closing all fluid supply valves to a pump would starve the pumps and force them to run dry. Running dry could potentially damage the pumps and create severe hammering in the downstream piping. Therefore, in certain embodiments, the systems and methods of the present disclosure include a control mechanism that prevents the high-pressure pumps from losing all fluid supply. In certain embodiments, the control mechanism may be created using a computer logic system including, but not limited to, DCS and PLC equipment. In other embodiments, the control mechanism may be hardwired into the valve positioning systems. In still other embodiments, the control mechanism may use a hydraulic or mechanical system. With reference to FIG. 1, the control mechanism ensures that when operations swap from proppant fracturing to diverter operations, the first bypass valve 112 must open before the first outlet valve 116 may close and the second outlet valve 118 must open before the second bypass valve 114 may close. The control mechanism also ensures that when operations swap from diverter operations to proppant fracturing, the first outlet valve 116 must open before the first bypass valve 112 may close and the second bypass valve 114 must open before the second outlet valve 118 may close.

In certain embodiments, the systems and methods disclosed herein may be used for numerous proppant fracturing and diverter operations at a particular well site. When swapping between proppant fracturing and diverter operations, it is often desirable to do a cleaning flush of the mixer to clear any excess solids that may have been left in the mixer. In certain embodiments, the systems disclosed herein may be integrated into a mobile unit that may be easily transported from one well site to another. In other embodiments, the systems disclosed herein are standalone units that are installed at a well site.

An embodiment of the present disclosure is a method comprising receiving a base fluid; mixing an additive to a portion of the base fluid to form at least a portion of the well treatment fluid; and supplying the portion of the well treatment fluid to at least one or both of a first discharge pump selectively fluidically coupled to a mixer and a second discharge pump selectively fluidically coupled to the mixer.

Another embodiment of the present disclosure is a system comprising a mixer comprising an inlet and an outlet; a base fluid source selectively fluidically coupled to the inlet of the mixer; a first discharge pump selectively fluidically coupled to the outlet of the mixer; and a second discharge pump selectively fluidically coupled to the outlet of the mixer.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are each defined herein to mean one or more than one of the element that it introduces. While compositions and methods are described in terms of "comprising," "containing," or "including" various components or steps, the compositions and methods can also "consist essentially of" or "consist of" the various components and steps.

A number of examples have been described. Nevertheless, it will be understood that various modifications can be made. Accordingly, other implementations are within the scope of the following claims.

What is claimed is:

1. A method for blending a well treatment fluid at a well site, comprising:
　　receiving a base fluid;
　　mixing an additive to a portion of the base fluid to form at least a portion of the well treatment fluid;

supplying the portion of the well treatment fluid to at least one or both of a first discharge pump selectively fluidically coupled to a mixer and a second discharge pump selectively fluidically coupled to the mixer; and operating a plurality of valves so as to select one of the first discharge pump and the second discharge pump to receive a flow of the portion of the well treatment fluid from the mixer wherein the plurality of valves comprises:

an inlet valve operable to fluidically couple a source of the base fluid with the mixer;

a first bypass valve operable to fluidically couple the source of the base fluid with the first discharge pump;

a second bypass valve operable to fluidically couple the source of the base fluid with the second discharge pump;

a first outlet valve operable to fluidically couple the mixer with the first discharge pump; and a second outlet valve operable to fluidically couple the mixer with the second discharge pump.

2. The method of claim 1, further comprising:
operating the plurality of valves so as to select the one of the first discharge pump and the second discharge pump not previously selected to receive the flow of the portion of the well treatment fluid from the mixer.

3. The method of claim 1 further comprising:
controlling the flow of the base fluid and the well treatment fluid so that each discharge pump never runs dry.

4. The method of claim 3, wherein the mixer is fluidically coupled to the first discharge pump.

5. The method of claim 1, wherein the additive is a proppant.

6. The method of claim 1, wherein the additive is a diverter.

7. The method of claim 4, wherein the mixer is fluidically coupled to the second discharge pump.

8. The method of claim 1, further comprising:
supplying a second portion of the base fluid to one of the first discharge pump or the second discharge pump.

9. The method of claim 1, further comprising:
introducing the well treatment fluid into a wellbore penetrating a subterranean formation at a pressure sufficient to create or enhance one or more fractures within the subterranean formation.

10. A system for blending a well treatment fluid at a well site, comprising:
a mixer comprising an inlet and an outlet;
a base fluid source selectively fluidically coupled to the inlet of the mixer;
a first discharge pump selectively fluidically coupled to the outlet of the mixer;
a second discharge pump selectively fluidically coupled to the outlet of the mixer; and
a plurality of valves comprising:
an inlet valve operable to fluidically couple the base fluid source with the inlet of the mixer;
a first bypass valve operable to fluidically couple the base fluid source with the first discharge pump;
a second bypass valve operable to fluidically couple the base fluid source with the second discharge pump;
a first outlet valve operable to fluidically couple the outlet of the mixer with the first discharge pump; and
a second outlet valve operable to fluidically couple the outlet of the mixer with the second discharge pump.

11. The system of claim 10, wherein the mixer further comprises an additive inlet.

12. The system of claim 10, wherein the well treatment fluid comprises a proppant.

13. The system of claim 10, wherein the well treatment fluid comprises a diverter.

14. The system of claim 10, wherein the well treatment fluid is a slurry.

15. The system of claim 10, wherein the system is installed at a well site location for a well treatment operation.

16. The system of claim 10, wherein the system is integrated into a mobile unit.

* * * * *